United States Patent [19]
Haller

[11] 3,839,126
[45] Oct. 1, 1974

[54] PLASTIC WELDING APPARATUS

[75] Inventor: Samuel L. Haller, Merrill, Mich.

[73] Assignee: The Dow Chemical Company, Midland, Mich.

[22] Filed: July 3, 1972

[21] Appl. No.: 268,898

[52] U.S. Cl.................. 156/497, 156/306, 156/322
[51] Int. Cl............................................ B32b 35/00
[58] Field of Search ............. 156/82, 306, 322, 497; 219/129, 136

[56] References Cited
UNITED STATES PATENTS

| | | | |
|---|---|---|---|
| 2,722,964 | 11/1955 | Duncan | 156/497 |
| 3,580,789 | 5/1971 | Wenzel | 156/497 |
| 3,658,627 | 4/1972 | Kaminsky | 156/497 |

FOREIGN PATENTS OR APPLICATIONS

| | | | |
|---|---|---|---|
| 806,009 | 12/1958 | Great Britain | 156/497 |

Primary Examiner—Charles E. Van Horn
Assistant Examiner—Caleb Weston
Attorney, Agent, or Firm—Robert B. Ingraham

[57] ABSTRACT

Thermoplastics are welded employing a filler rod to give high strength reliable joints using temperature controlled insert, gas and preheating of the material to be welded and the filler rod.

8 Claims, 7 Drawing Figures

PATENTED OCT 1 1974 3,839,126

PLASTIC WELDING APPARATUS

Welding of thermoplastics has been known for many years. One of the earlier references to such welding is in U.S. Pat. No. 2,220,545 wherein a thermoplastic sheet is welded by applying a stream of hot gas to the area to be joined and working the heat plastified material with the filler rod at a temperature below the decomposition temperature of the plastic material and above its softening point in a manner somewhat similar to the technique of fusion welding with an oxygen acetylene torch and filler rod. Other so-called plastic welding techniques have been used such as those disclosed in U.S. Pat. Nos. 2,372,737 and 2,556,609 and Italian Pat. No. 560,833. The later two references are concerned with heat lamination; that is, the softening of a surface of a strip and joining the strip to one or more thermoplastic substances. Plastic welding such as disclosed in U.S. Pat No. 2,220,545 employing a filler rod has been utilized over the years for joining plastic plates and constructing chemical process equipment including applying flanges to plastic pipe, fabricating tank linings and the like. Plastic welding has not been entirely satisfactory. The term "plastic welding" as employed herein contemplates the welding of synthetic resinous thermoplastics wherein a filler rod is supplied and fused to a substrate. Plastic welding has not been as successful as the corresponding welding techniques employed for fusion welding of metals utilizing oxyacetylene torches and a filler rod. Welded products of thermoplastics in general require considerable overdesign in the joint areas as welds tend to have strength substantially below the strength of the parent materials. Thus for a given strength a substantially thicker material is required to compensate for the probable low strength of the weld. Frequently, employing the plastic welding techniques such as are generally disclosed in U.S. Pat. No. 2,220,545, a commonly used solution to improved welding performance and fusion is to provide large volumes of high velocity heated gas which frequently does not provide the desired quality of weld and requires high power input and high gas consumption. Both of these factors contribute to a high degree of splatter; that is, entrainment of particles of heat plastified materials in the gas stream which is undesirable from a safety and environmental standpoint. Some plastic welding equipment uses a nozzle which has an air discharge opening and a rod preheating passage included within a common housing, the terminal portion of the housing being employed to press the softened rod into the region being welded.

It would be desirable if there were available an improved method and apparatus for the fusion welding of synthetic resinous thermoplastics employing a filler rod.

It would also be desirable if there were available a simple apparatus for the fusion welding of thermoplastics having low gas consumption.

It would further be desirable if there were available an improved method and apparatus for the preparation of fusion strands in synthetic resinous thermoplastics whereby high strength reliable joints can be obtained.

These features and other advantages in accordance with the present invention are achieved in a method for welding synthetic resinous organic thermoplastic materials wherein a heated stream of gas is impinged on a thermoplastic substrate to be welded and an organic thermoplastic synthetic resinous welding rod is heated by the gas stream, the rod applied to and forced against the substrate and the rod fusion bonded to the substrate, the improvement which comprises applying a first or welding portion of the heated gas directly to the region of the substrate being welded, applying a second or work preheat portion of the heated gas to a region immediately preceding the region being welded and applying a third or filler rod preheat portion of the heated gas to the filler rod immediately prior to welding and contacting the heated filler rod and the substrate with minimal manipulation while maintaining the temperature of the gas stream within a range of about 50°F. and beneficially 20°F., and preferably within a range of about 10°F.

Also contemplated within the scope of the present invention is a welding apparatus for the welding of synthetic resinous thermoplastics, the welding apparatus comprising a gas supply means, a gas supply regulating means, gas heating means, the gas heating means having an entrance end and an exit end, the entrance end being in communication with the gas supply means, the gas discharge means being connected to a discharge nozzle, a gas temperature sensing means being disposed within the region of the gas discharge, the gas discharge means being in operative combination with power control means, the power control means supplying power to the gas heating means, the nozzle terminating in a discharge end, the discharge end having in operative combination therewith a rod support and a gas stream shaping means in operative combination with the discharge end and adapted to receive a heated gas stream and form the gas stream into at least first, second and third portions, the first portion being directed toward the rod support, the rod support being adjacent to the means providing the first stream portion, means providing a second discharge portion positioned adjacent means to provide the first discharge portion and remotely disposed from the rod support, means defining a third discharge generally adjacent a second discharge and remote from the first discharge.

Further features and advantages of the present invention will become more apparent from the following specification taken in connection with the drawing wherein.

Figure 1:
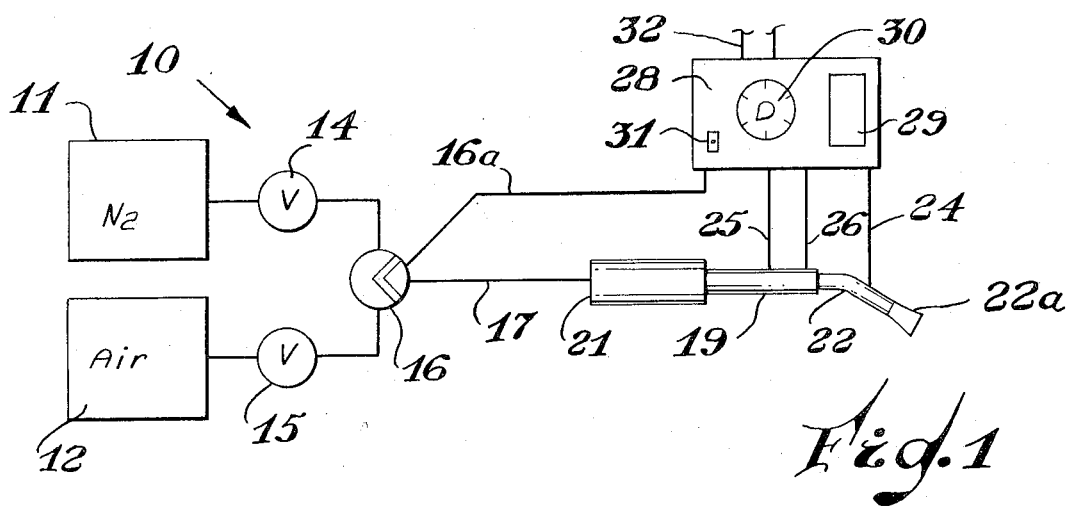
FIG. 1 is a schematic representation of apparatus of the invention.

In FIG. 1 there is schematically depicted a welding apparatus in accordance with the invention generally designated by the reference numeral 10. The apparatus 10 comprises in cooperative combination a first or inert gas supply means 11, a second or purge gas supply means 12, a first gas regulator 14 and a second gas regulator 15. A three way or selector valve 16 is in operative communication with the regulators 14 and 15 by means of an appropriate conduit. The discharge of the valve 16 is in communication with a discharge conduit 17. The discharge conduit 17 is selectively connected to the output of the regulators 14 or 15 by means of the valve 16. A gas heater or torch body 19 having an inlet end 21 and a discharge end 22 is in operative communication with the conduit 17 at the first end 21. A welding nozzle 22a is operatively connected to the discharge end 22. A temperature sensing means 24 such as a thermocouple is connected adjacent the end 22 of the body 19. The body 19 is generally similar in construction to the torch disclosed in U.S. Pat. No. 2,220,545, the teachings of which are herewith incorporated by reference thereto. Power leads 25 and 26 are connected to a heating coil, not shown, within the body 19. A control cable 16a is operatively connected to the three-way valve 16 and on the application of suitable power causes communication of the conduit 17 with the output of either of the regulators 14 and 15. The temperature sensing means 24, the power supply lines 25 and 26 and the control cable 16a are in operative combination with a control console 28. The control console 28 has a power control unit 29 in combination with temperature selecting means 30 and a control switch 31 in operative communication by means of a cable 16a with the three-way valve 16. An electrical power source 32 provides power to the console 28.

In operation of the apparatus as depicted in FIG. 1, air from the second gas source 12 is passed through the regulator 15 at a desired rate, through the three-way valve 16 into the torch body 19 where it is heated and discharged from the discharge end 22 into a nozzle, not shown. The air passing over the temperature sensing means or thermocouple 24 provides a signal to the power control 29 which has been set by means of the selector 30 to a predetermined desired temperature. Any variation in the temperature of the gas is rapidly sensed and an appropriate power input adjustment automatically made by conventional readily available control mechanisms well known to those skilled in the art. Solid state electronic controls are eminently satisfactory. The gas temperature is readily maintained within ± 1°F. When the desired operating temperature is achieved the three-way valve 16 disconnects the second gas supply and connects the first gas supply to provide a generally inert gas such as nitrogen. The regulators 14 and 15 are set to deliver generally equal volumes, and temperature control of the gas passing through the torch body 19 is obtained with a minimal waste of an inert gas such as nitrogen, argon or the like.

Figure 2:
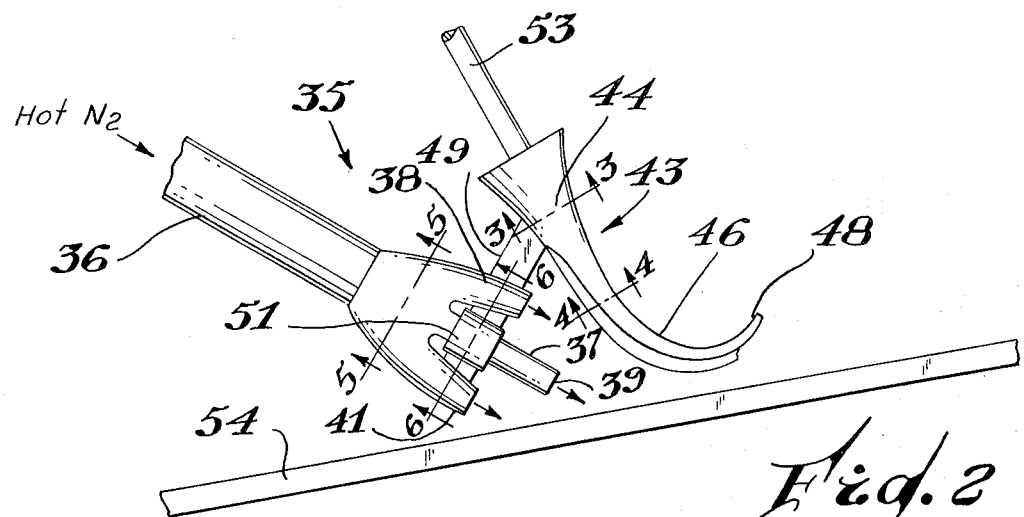
FIG. 2 is a view of a welding nozzle of the present invention.

FIG. 2 schematically shows a representation of a nozzle assembly generally designated by the reference numeral 35. The welding nozzle assembly 35 is affixed to the second end 22 of the torch body 19 as is the nozzle 22a of FIG. 1. The nozzle assembly 35 comprises an inlet end 36, a discharge end 37 and an internal passageway, not shown. The discharge end 37 has a first discharge means 38, a second or central discharge means 39 and a third discharge means 41. The discharge means 39 is disposed generally intermediate the first discharge means 38 and the third discharge means 41. The discharge means 38, 39 and 41 dispense a heated air stream generally in the directions indicated by the arrows. A rod guide 43 is disposed generally adjacent the second end 39 of the nozzle assembly 35. The rod guide 43 comprises a short tubular body portion 44 generally remotely disposed from the discharge means 39 and a curved tapering dependent tongue portion 46 extending toward and beyond the second discharge 39, the tongue 46 having a terminal portion 48 disposed remote from and in angular relationship to a central axis passing through the second nozzle 39. A bracket 49 is affixed to the generally tubular portion 44 of the guide 43 and beneficially is releaseably connected to the portion of the nozzle forming the discharge 39 by means of the sleeve 51. A synthetic resinous thermoplastic welding rod 53 is shown passing through the guide 43 and following the tongue 46. The tongue 46 is used to force the heat plastified rod into contact with the substrate. A substrate 54 to be welded is depicted adjacent the nozzle assembly 35 and spaced slightly therefrom for ease of illustration. The heat softened rod is pressed into the region being welded by the tongue 46 as the nozzle is moved in the direction generally away from the terminal portion 48 of the tongue 46.

Figure 3:
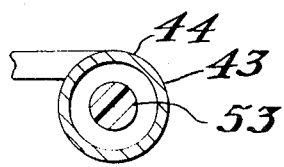
FIGS. 3–6 are sectional views of the apparatus taken along the lines 3—3, 4—4, 5—5 and 6—6 of FIG. 2.

In FIG. 3 there is depicted a view through the portion 44 of the guide 43 along the line 3—3 of FIG. 2 showing the location of the rod 53 therein.

Figure 4:
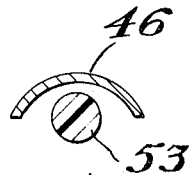

FIG. 4 is a similar view taken along the line 4—4 of FIG. 2.

Figure 5:
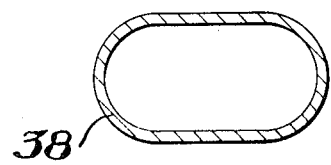

FIG. 5 is a sectional view of the nozzle assembly 35 taken along the line 5—5 of FIG. 2.

Figure 6:
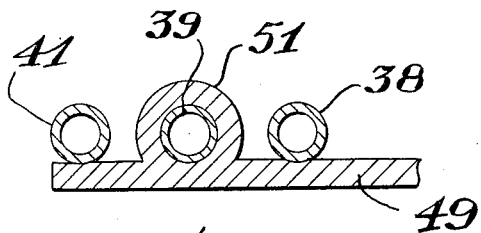

FIG. 6 is a sectional view of the nozzle assembly 35 taken along the line 6—6 of FIG. 2.

Figure 7:
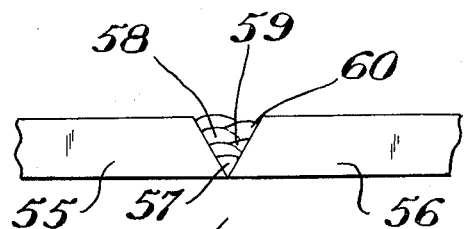
FIG. 7 is a schematic sectional representation through a weld made in accordance with the present invention employing the apparatus of FIGS. 1–6.

FIG. 7 is a schematic sectional representation through a weld made in accordance with the present invention. A first substrate member 55 is positioned adjacent a second substrate member 56 and a plurality of beads 57, 58, 59 and 60 are disposed in a generally V-shaped space defined between the substrates 55 and 56. In making a multiple pass weld in accordance with the present invention, generally it is desirable to employ a bead sequence in the manner commonly utilized with arc welding.

Employing apparatus generally as shown in the drawing wherein the rod is about ⅛ inch in diameter and each of the nozzles 38, 39 and 41 are of about ⅛ inch inside diameter, very satisfactory welds are prepared using a nitrogen flow rate of about ½ cubic foot per minute and nitrogen temperatures ranging from 720° to 770°F. on polypropylene. The nozzle is prepared principally from brass tubing. Corner welds and butt welds on ¼ inch thick plate specimens can be twisted and bent without rupture. Tensile tests on flat plate sections indicate that on flat butt welded samples values equal to unwelded material are obtained and in many cases on rupture the rupture does not occur at the weld. The method and apparatus of the present invention are also applied with benefit with other weldable thermoplastics set forth in Table I which includes gas temperature employed.

TABLE I

| PLASTIC | GAS TEMPERATURE °F. |
|---|---|
| Saran (a vinylidene chloride copolymer) | 680 |
| Halar (a fluorocarbon polymer) | 800 |
| Polyvinylchloride | 700 |
| Teflon (polytetrafluoroethylene) | 820 |
| Penton (a polyether) | 675 |
| Kynar (a fluorocarbon polymer) | 800 |
| Polyethylene | 720 |

The temperatures given in Table I above are relative and represent the temperature sensed by the temperature sensing means 24 of FIG. 1 and do not necessarily represent the temperature of the gas stream at the weld or the weld temperature. Generally, within the welding range, which must be determined experimentally for each different lot of plastic sheet, it is desirable to weld at the lowest convenient temperature in order to obtain maximum strength. Softening of the plastic material in the gas stream is time and temperature dependent, and although very rapid welds can be made by operating at higher temperatures, usually the quality of the weld is lower than that obtained at lower temperatures. This is probably because of thermal decomposition of the plastic at the surfaces caused by high temperature gas. Employing apparatus and the method of the present invention most operators develop personal preferences for minor variations in welding techniques.

Not all commercially available plastic sheets are readily weldable to provide high strength joints. Some sheets when heated appear to exude a waxy or oil-like substance on the surface. In general poor results can be expected from these materials. However, the method and apparatus of the present invention usually provide a stronger weld than when conventional techniques are employed.

In practice of the present invention stronger welds are obtained when only a relatively small area of the filler rod and substrate are heated; that is, the materials employed in a weld should be brought to a welding temperature as rapidly as possible without undue heating. The rod guide as depicted in FIG. 2 accomplishes uniform rapid heating of the rod by exposing a large portion of the surface of the rod immediately adjacent the nozzle 38, and beneficially, due to thermal conduction of heat from the metal such as brass or aluminum from which the guide 43 is prepared, the entire rod is heat plastified in a relatively short period of time. If the rod guide tubular body portion 44 is lengthened and subjected to sufficient heat to cause significant preheating of the rod before the rod is subjected to the gas stream from the nozzle 38, inferior welds are obtained. Generally it is desirable, if the rod guide is metal, to maintain its length at about 2 to 10 diameters.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A welding apparatus for the welding of synthetic resinous thermoplastics, the welding apparatus comprising
   a gas supply means,
   a gas supply regulating means,
   a gas heating means, the gas heating means having an entrance end and
   an exit end, the entrance end being in communication with the gas supply means,
   a discharge nozzle connected to the exit end,
   a gas temperature sensing means disposed adjacent the exit end, the gas temperature sensing means being in operative combination with
   power control means, the power control means supplying power to the gas heating means,
   a nozzle terminating in
   a discharge end, the discharge end having in operative combination therewith
   a rod support and
   a gas stream shaping means in operative combination with the discharge end and adapted to receive a heated gas stream and form the gas stream into at least first, second and third portions, the first portion being directed toward the rod support, the rod support being adjacent to the means providing the first stream portion,
   means providing a second discharge portion positioned adjacent means to provide the first discharge portion and remotely disposed from the rod support, and
   means defining a third discharge generally adjacent a second discharge and remote from the first discharge.

2. The apparatus of claim 1 wherein the rod support has a generally arcuate configuration terminating remote from the nozzle.

3. A welding apparatus for the welding of synthetic resinous thermoplastics, the welding apparatus comprising
   a gas supply means,
   a gas supply regulating means,
   a gas heating means, the gas heating means having an entrance end and
   an exit end, the entrance end being in communication with the gas supply means,
   a discharge nozzle connected to the exit end,
   a gas temperature sensing means disposed adjacent the exit end, the gas temperature sensing means being in operative combination with
   power control means, the power control means supplying power to the gas heating means,
   a nozzle terminating in
   a discharge end, the discharge end having in operative combination therewith
   a rod support, the rod support being detachably affixed to the nozzle, and
   a gas stream shaping means in operative combination with the discharge end and adapted to receive a heated gas stream and form the gas stream into at least first, second and third portions, the first portion being directed toward the rod support, the rod support being adjacent to the means providing the first stream portion,
   means providing a second discharge portion positioned adjacent means to provide the first discharge portion and remotely disposed from the rod support, and
   means defining a third discharge generally adjacent a second discharge and remote from the first discharge.

4. The apparatus of claim 3 wherein the rod support has a generally arcuate configuration terminating remote from the nozzle.

5. The apparatus of claim 3 wherein the means for providing the gas portions is a trifurcated tube with discharge portions generally parallel but divergent.

6. A welding apparatus for the welding of synthetic resinous thermoplastics, the welding apparatus comprising
   a gas supply means,
   a gas supply regulating means,
   a gas heating means, the gas heating means having an entrance end and an exit end, the entrance end being in communication with the gas supply means, a discharge nozzle connected to the exit end, a gas temperature sensing means disposed adjacent the exit end, the gas temperature sensing means being in operative combination with power control means, the power control means supplying power to the gas heating means, a nozzle terminating in a discharge end, the discharge end having in operative combination therewith a rod support and the nozzle being a trifurcated tube with discharge passages generally parallel but divergent, the nozzle being in operative combination with the exit end and adapted to receive a heated gas stream and form the gas stream into at least first, second and third portions, the first portion being directed toward the rod support, the rod support being adjacent to the means providing the first stream portion, means providing a second discharge portion positioned adjacent means to provide the first discharge portion and remotely disposed from the rod support, and means defining a third discharge generally adjacent a second discharge and remote from the first discharge.

7. The apparatus of claim 6 wherein the rod support has a generally arcuate configuration terminating remote from the nozzle.

8. The apparatus of claim 6 wherein the rod support is detachably affixed to the nozzle.

* * * * *